United States Patent
Frydman et al.

(10) Patent No.: US 9,736,510 B2
(45) Date of Patent: Aug. 15, 2017

(54) METHODS CIRCUITS DEVICES SYSTEMS AND ASSOCIATED COMPUTER EXECUTABLE CODE FOR TRANSMITTING A VIDEO STREAM TO A MOBILE COMMUNICATION DEVICE

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

(*) Notice: Subject to any disclaimer, the term of this patent is extended or adjusted under 35 U.S.C. 154(b) by 463 days.

(21) Appl. No.: 14/195,038

(22) Filed: Mar. 3, 2014

(65) Prior Publication Data
US 2014/0289781 A1    Sep. 25, 2014

Related U.S. Application Data

(60) Provisional application No. 61/771,867, filed on Mar. 3, 2013.

(51) Int. Cl.
| | |
|---|---|
| *H04N 7/16* | (2011.01) |
| *H04N 21/238* | (2011.01) |
| *H04N 21/222* | (2011.01) |
| *H04N 21/61* | (2011.01) |
| *H04N 21/414* | (2011.01) |
| *H04N 21/24* | (2011.01) |

(52) U.S. Cl.
CPC ... *H04N 21/23805* (2013.01); *H04N 21/2223* (2013.01); *H04N 21/2401* (2013.01); *H04N 21/41407* (2013.01); *H04N 21/6131* (2013.01); *H04N 21/6181* (2013.01)

(58) Field of Classification Search
CPC ......... H04N 21/23805; H04N 21/2401; H04N 21/6373; H04N 21/64738
See application file for complete search history.

(56) References Cited

U.S. PATENT DOCUMENTS

| | | | |
|---|---|---|---|
| 2008/0068997 A1* | 3/2008 | Krause | H04N 21/23406 370/232 |
| 2009/0285282 A1* | 11/2009 | Amir | H04L 47/10 375/240.02 |
| 2013/0308919 A1* | 11/2013 | Shaw | H04N 21/2221 386/239 |

* cited by examiner

*Primary Examiner* — Gigi L Dubasky
(74) *Attorney, Agent, or Firm* — Vladimir Sherman; Professional Patent Solutions (57) ABSTRACT

Disclosed are methods, circuits, devices, systems and associated computer executable code for transmitting video data to a client device, optionally over a wireless communication link. According to some embodiments, a video pacing agent may be integrated or otherwise functionally associated with a segment of a communication network and may regulate and/or pace video data delivery to a client device, wherein regulating and pacing may factor an estimation of a state or fullness level of a receive buffer on the client device.

9 Claims, 5 Drawing Sheets

METHODS CIRCUITS DEVICES SYSTEMS AND ASSOCIATED COMPUTER EXECUTABLE CODE FOR TRANSMITTING A VIDEO STREAM TO A MOBILE COMMUNICATION DEVICE

CROSS REFERENCE

The present application claims the priority of U.S. Provisional Patent Application 61/771,867, filed by the inventors of the present application on Mar. 3, 2013, which is hereby incorporated by reference into the present application in its entirety.

FIELD OF THE INVENTION

Some embodiments relate generally to the field data communication. More specifically, some embodiments relate to conveying a video stream to a mobile communication device over a communication link, such as a wireless communication link of a wireless access point or basestation.

BACKGROUND

Remote on-demand access to computer and communication network resources, including Internet access is widespread. With the Internet becoming increasingly popular and almost ubiquitous, more and more network users are able to connect to an ever-growing body of content stored on an ever-growing number of remote servers using almost any electronic device with an internet connection. Users are able to connect to the Internet from home computers, laptops, tablets, smart phones, e-book readers, and any other mobile Internet device. When connected to the internet, users often download or stream significant amounts of data from various data sources, such as websites, media servers and Application Servers, hosted on servers connected to the Internet or on Content Delivery Networks (CDN's).

Data servers, Media Servers and Application Engines connected to a data network, such as the Internet, at one or more network nodes, are typically identifiable and addressable using an Internet Protocol (e.g. IP v4 and v6) address. Websites and other data sources connected to the Internet are, however, typically associated with a server name or domain name. The Domain Name System (DNS) is a hierarchical distributed naming system for computers, services, or any resource connected to the Internet or a private network. It associates various information with domain names assigned to each of the participating entities. A Domain Name Service resolves queries for these names into IP addresses for the purpose of locating computer services and devices either on a local network or worldwide on the Internet. By providing a worldwide, distributed keyword-based redirection service, the Domain Name System is an essential component of the functionality of the Internet.

An often-used analogy to explain the Domain Name System is that it serves as the phone book for the Internet by translating human-friendly computer hostnames into IP addresses. For example, the domain name www.example.com translates to the addresses 192.0.43.10 (IPv4) and 2620:0:2d0:200::10 (IPv6). Unlike a phone book, DNS can be quickly updated and these updates are distributed, allowing a service's location on the network to change without affecting the end users, who continue to use the same hostname. Users take advantage of this when they recite meaningful Uniform Resource Locators (URLs) and e-mail addresses without having to know how the computer actually locates the services.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continually consulted and updated. Additionally, the responsibility for maintaining and updating the master record for the domains is spread among many domain name registrars, who compete for the end-user's, domain-owner's, business. Domains can be moved from registrar to registrar at any time. The Domain Name System also specifies the technical functionality of this database service. It defines the DNS protocol, a detailed specification of the data structures and communication exchanges used in DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain name, such as address (A) records, name server (NS) records, and mail exchanger (MX) records (see also list of DNS record types); a DNS name server responds with answers to queries against its database.

The growing demand for packet data (e.g. TCP/IP) services over mobile networks, including: (1) mixed and rich content websites and (2) video and audio content streaming, has fostered enormous bandwidth and data traffic requirements for mobile communication/access networks. A single webpage may include URL's to multiple content sources, static and dynamic, and the loading of a single webpage may typically require between 15 and 20 DNS transactions with a remote DNS server. During peak network traffic hours, these requests may take between 3 and 4 seconds, thereby leading to a long delay in start of service and to customer frustration.

Additionally, since in 2009 the volume of data traffic over mobile network exceeded that of voice traffic, mobile data has more or less tripled each year in volume thus taking over more and more of the mobile traffic in volume. On the profitability side, mobile data opens new revenue possibilities to the Mobile Network Operators (MNOs). A major obstacle standing before the MNOs, however, is their inability to connect to the content thus suffering from the Over-The-Top (OTT) syndrome. In addition, many of the applications generate data that withholds inflexible requirement on the way traffic should be served over the network. In order to enable adequate user experience, the data must be supplied to the User Equipment (UE) according to strict bit-rate requirements. Any deviations from these requirements automatically lead to lousy experience thus to the abandonment of this service by consumers.

An additional important factor is the protocol used to pass data over the network—Transmission Control Protocol (TCP). Wireless networks are characterized by high losses due to radio propagation impairments, high delays and limited bandwidth. Small scale degradations over the air interface, such as fast fading, induce fluctuations, and losses over the air interface are mistakenly taken as congestion over the fixed networks by TCP. Although radio link control mechanisms typically use retransmissions to achieve error free communications over the air interface, these radio retransmissions cause delays that are large compared to TCP timescales, resulting in degradation of end-to-end throughput through the network. A major issue is that TCP misinterprets errors over wireless links as congestions and reacts by retransmitting TCP segments and by reducing the congestion window and thus the overall application throughput. The main factors driving the TCP performance are the TCP roundtrip delay and Packet loss. Reducing the RTT and packet loss can dramatically improve the TCP behavior and thus the way data is passing over the network.

The majority of mobile data is video and predictions are that as mobile data grows, the mobile videos portion will grow at a much faster rate than non-video mobile data. On the profitability side, however, video accounts for the lowest incomes to the operator per byte compared to other types of mobile data, which poses a financial burden. Additionally, video is an application which generates inflexible requirement on the way traffic should be served over the network. More specifically, in order to enable adequate user experience, the video must be supplied to the User Equipment ("UE") and also referred to as mobile device, mobile communication device, etc.) according to strict bit-rate requirements. Any deviation from these requirements automatically leads to a poor user experience thus to the abandonment of this service by consumers.

One option to cope with this problem is to continually send data to the UE as fast as possible, ensuring that the UE never reaches "starvation" and always holds the next video frames for display locally. This may insure good user experience for a single user but will lead to an overload of the entire network which is already overflowed with data, thus leading to unacceptable user experience to all end users and to high operating expenses (OPEX) on the operator's side required to ensure this traffic will actually be delivered to the users. In addition, this type of solution will lead to additional expenses to the end users as they will be charged for a big portion of video which they didn't actually consume (once a user requests to view a video, a large portion of this video will be downloaded to the UE regardless if the user ends up viewing only the very beginning of this video).

Accordingly there is a need for solutions which on one hand ensure good user experience when consuming video and on the other hand factor network resources and don't degrade network behavior.

SUMMARY OF THE INVENTION

The present invention includes methods, circuits, devices, apparatuses, systems and associated computer executable code for transmitting a video stream to mobile communication devices communicatively coupled to a communication network, for example: (1) a local or wide area data network, (2) a wireless/mobile data network, (2) a cellular communications network, (3) a video streaming network and (4) any other data network type known today or to be devised in the future. According to embodiments, the communication network may include at least one Network Core (NC) connected through one or more data tunnels to one or more network access segments, which segments may be comprised of: (1) a single wireless access point, base-station and/or cell site (hereinafter "Access Point" or "AP"), and/or may include (2) any combination of access points, base-stations and/or cell sites in geographic or communicational proximity with one another (hereinafter collectively "Access Points" or "AP's"). As video data is transported across segments of the network, from a video server or source to a client device, a video delivery regulating and/or pacing mechanism, which may be in the form of a video pacing module or video pacing agent, may regulate and pace video data delivery to the client device in a manner intended to provide the client device with at least a minimum quality of service level (e.g. minimum video bit rate), while factoring network resource utilization. Network resource utilization may be factored, and optionally balanced, so as to ensure network resources availability to other client devices connected to the network.

According to some embodiments, there may be provided a video (data or stream) pacing module or agent, either of which can be referred to as a video pacing agent. The video pacing agent may dynamically regulate timing and/or pacing of transmission of each of one or more video stream sessions, wherein each video transmission session may be between a video data source accessible through the network and a mobile communication device communicatively coupled to the network through a wireless communication link. A mobile communication device receiving video data may be referred to as a mobile device, a client device or as a video client device. The pacing agent may be located in-line between a network gateway with access to the video source(s) and the access point used by the client device to connect to the network. Accordingly, the pacing agent may be located at or near the network core, or at or near the access segment of the network. According to some embodiments, the pacing agent may be integrated with an access points, a base-station or any combination thereof. The pacing agent, according to embodiments, may reside: (1) at or near a network core, (2) at or near a network access point, and/or (3) within a network tunnel area. Pacing agents residing within tunneled areas of a communication network may include communication processing circuits or logic supporting any type on network tunnel protocols, including L2TP, GTP, PPP, IuPS, IuB, etc.

According to some embodiments, the pacing agent may be a discrete and standalone device or network appliance, or the pacing agent may be code or a software module running on a network router, network switch, network gateway, etc. Aspects of the present invention may provide for an increase or augmentation of the number and/or quality of video sessions handled by a communication network without the need to add additional hardware or communication bandwidth, lines or paths between the network elements.

According to further embodiments, the pacing agent may include or otherwise be associated with a receive buffer simulator or estimator (hereinafter "buffer simulator"), which receive buffer simulator may simulate and/or estimate a state and/or fullness level of a receive buffer, such as a (video) jitter buffer, on a client device receiving a video data stream as part of a video streaming session handled by the pacing agent. The buffer simulator may maintain a running estimate of the state and/or fullness for substantially each receive buffer of each client device engaged in a video streaming session being handled by the pacing agent. The video data stream may be a data packet flow or a data packet stream, such as a TCP/IP packet stream/flow or a UDP packet stream/flow. The terms video stream, video data stream, dataflow, data stream, packet flow, packet stream, TCP/IP stream/flow, TCP flow/stream may be used interchangeably. The video stream may originate from another network element, a content source such as a data server, media server, application server, application engine and/or CDN (hereinafter "Content Source") accessible through the network. The client device may include devices such as a mobile phone, a computer, a tablet, a cellphone, a smartphone, etc. connected to an access point of the network.

According to some embodiments, the pacing agent may include or otherwise be functionally associated with one or more data transmission buffers, wherein each of the one or more video data transmission buffers may be a video session specific transmission buffer. Each of the one or more transmission buffers may request, receive and store video data from a respective video source associated with each of the video sessions being serviced by the pacing agent. Each of the one or more transmission buffers may request and store video data from a source of a given video session responsive to either signaling from control logic of the pacing agent and/or based on a native algorithm. Each of the one or more transmission buffers may release stored video data of the given video session to a given client device engaged in the given session responsive to either signaling from control logic of the pacing agent and/or based on a native algorithm.

According to embodiments, algorithms indicating when to request video data for a given session and when to release for transmission video data of the given session may factor parameters such as: (1) receive buffer state or fullness level at the given client device, (2) required bit rates for the given video stream session, (3) network conditions and (4) wireless link condition for the given client device. According to embodiments when the communication network is a cellular communication network, network condition along some segment of the dataflow path may include: (1) RF reception quality, (2) latency, (3) jitter, (4) network congestion and/or (5) any other relevant network condition information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A & 1B are network diagrams of exemplary cellular networks including a video pacing agent according to embodiments, wherein FIG. 1A shows the agent at or near an access point of the network, while FIG. 1B shows the agent at or near the network core;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The present invention includes method, circuits, devices, systems and associated computer executable code to implement a dynamic video pacing solution for a communication network, optionally by simulating and estimating a state of a jitter buffer in the video client device, per each TCP video stream passing over the network. According to some embodiments, the pacing is adapted to adjust the rate packets are being sent over each stream accordingly. A pacing agent or module, which may be placed in the network access segment, as close as possible to the end user (adjacent to the Base station or integrated into the Base station in mobile networks) may internally simulate the jitter buffer per TCP video stream being sent to a client device, ensuring that the packets being sent out per stream will keep the fullness of each jitter buffer within predefined ranges. The agent may assess the required bit rate for each video stream, either by extracting it directly from the first packets of the HTTP negotiation (HTTP Get/OK etc) or by receiving it from an external source thus enabling the agent to simulate the amount of traffic being evacuated from each jitter buffer in each client device. The agent may continually measure the amount of traffic sent out for each stream to each of the client devices, thus enabling it to simulate the way each jitter buffer is being filled and emptied of data. In addition, the agent may continually monitor the network conditions, either using indications received from an external source (in mobile networks from the base station for example) or by analyzing the total TCP traffic running in the network and/or TCP_Acks received for each stream. Using the network condition indication, the pacing agent can detect when more traffic can be driven towards the client devices and when less traffic should be released or driven per video stream. Using this insight the agent can push packets faster or slower on each stream according to the fullness of the each specific jitter buffer. This will ensure that, on one hand less traffic is passed over the network during congested periods and more when network resources are free, and on the other hand user experience is always good as the jitter buffers fullness is continually monitored and managed, ensuring that enough data is passed to each of jitter buffers throughout the full stream.

Figure 1A:
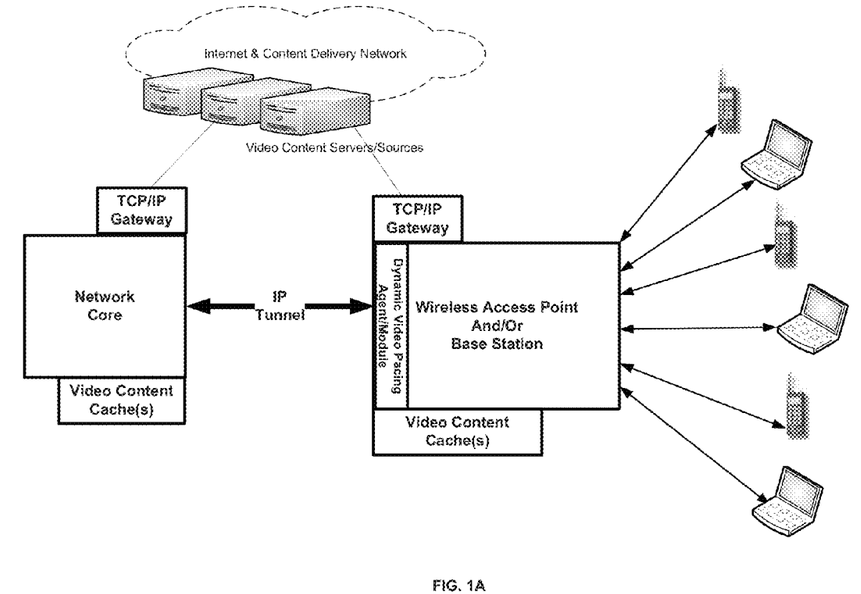
Figure 1B:
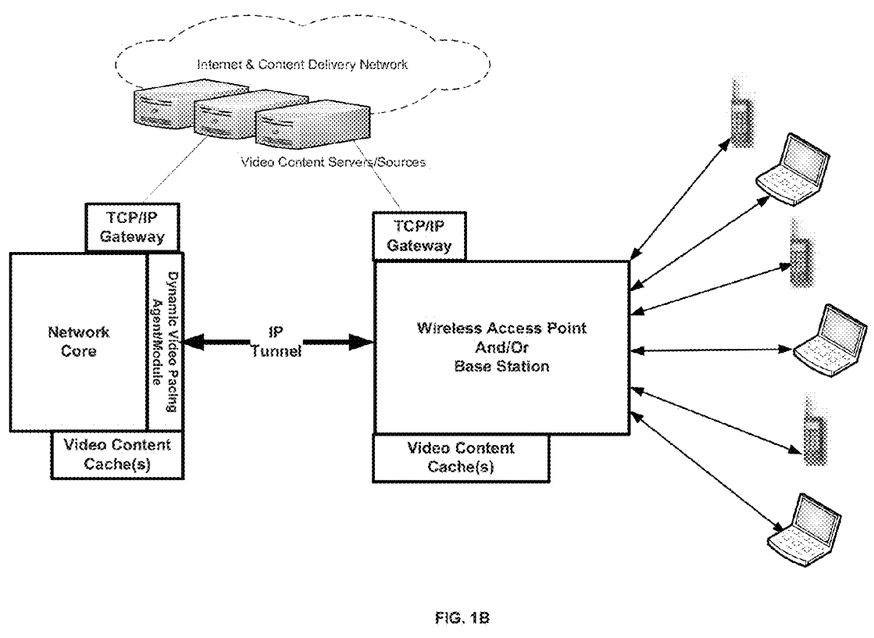

Turning now to FIGS. 1A and 1B, there are shown network diagrams of exemplary cellular networks including a video pacing agent according to embodiments. FIG. 1A shows the pacing agent at or near an access point of the network, while FIG. 1B shows the agent at or near the network core. According to all applicable architectures, the pacing agent is in-line between a video content source and the client device or devices receiving the video content.

Figure 2A:
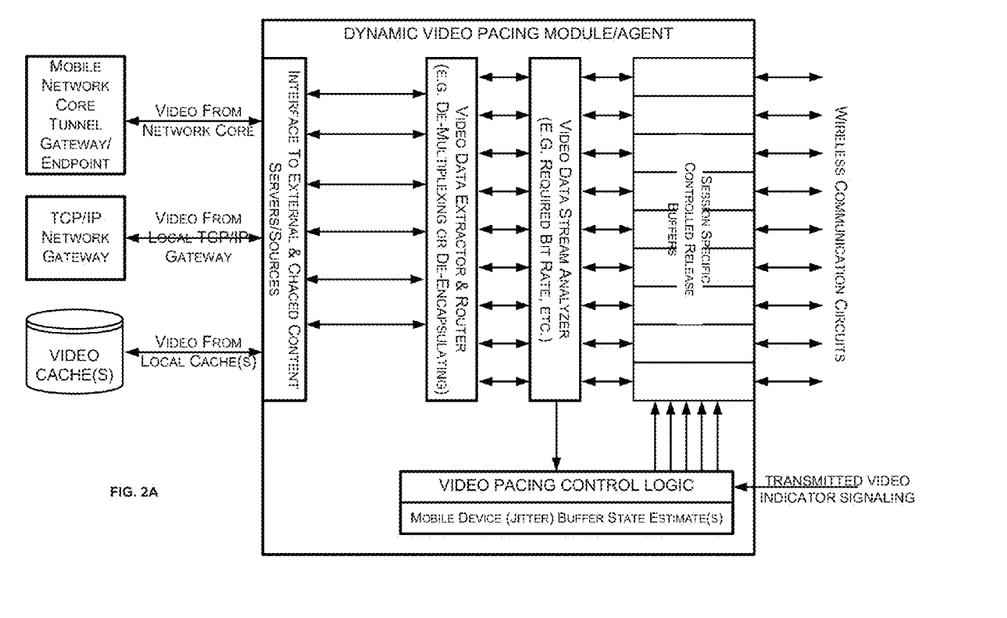
FIG. 2A is a functional block diagram of an exemplary (dynamic) video pacing agent or module according to embodiments, including interfaces for various segments of a cellular network, a video stream analyzer, a set of transmission buffers and control logic which includes a receive buffer simulator and data storage for estimated receive buffer state or fullness information.

Turning now to FIG. 2A, there is shown a functional block diagram of an exemplary (dynamic) video pacing agent or module according to embodiments, including interfaces for various segments of a cellular network, a video stream analyzer, a set of transmission buffers, and control logic which includes a receive buffer simulator and data storage for estimated receive buffer state or fullness information. According to embodiments, as one or more video content streams intended for respective client devices being handled by the pacing agent are received through the external content interface (e.g. from the network core, from the local TPC/IP gateway of from cache). They are extracted from the data flow within which they were multiplexed or encapsulated, optionally by a router and extractor. Then after extraction each video stream is analyzed, by a video stream analyzer, to determine video characteristics including bit rate. The analyzer may also be used to estimate upstream network conditions based on the rate and time of received video stream data. Data for each of the streams is buffered in a separate transmit buffer or in a separate segment of single transmit buffer. Release of data from the buffer for transmission to a respective client device may be triggered by an algorithm running on the pacing agent controller.

Figure 2B:
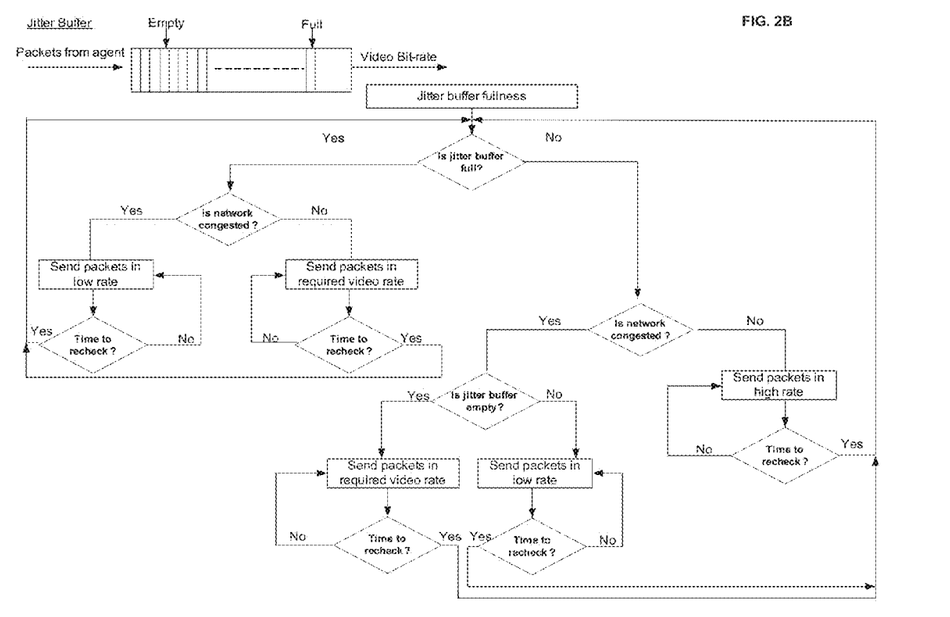
FIG. 2B is a flowchart including the steps of an exemplary algorithm by which a video pacing agent according to embodiments operates—(1) deciding when to request and store video data from a session specific video source, and (2) deciding when and at which rate to transmit session specific data to client device.

As part of an exemplary process, further elaborated in FIG. 2B, by which the controller may decide which transmit buffer or buffer segment will release data for transmission, and at what rate, to a respective client device, the controller or an associated circuit may simulate, estimate or otherwise assess a status of a receive (jitter) buffer on the respective client device. This estimation or assessment may be based on a comparison of the amount of data sent to the receive buffer versus the amount of data released from the receive buffer. The amount of data sent to the buffer may be assessed by counting and/or summing the data within the session specific packets sent to the client device, while the amount of data released from the receive buffer, in order to render the video on the client device, may be estimated by integrating the video bit/data rate across the duration the video stream has been transmitted to the client device. Accordingly, a per-session receive buffer fullness status (i.e. one per video stream/flow) may be continually monitored and estimated by the controller or associated circuits.

Turning now to FIG. 2B, there is shown a flowchart including the steps of an exemplary algorithm by which a video pacing agent according to embodiments operates—(1) deciding when to request and store video data from a session specific video source and (2) deciding when and at which rate to transmit session specific data to a client device. The algorithm, as executed by a controller or control logic, continually manages the bit-rate at which video data is released from buffer and sent to a respective client device (entering the jitter buffer) according to the estimated fullness of the respective jitter buffer. As long as the simulation of the jitter buffer indicates that the buffer has not reached the pre-defined full mark, the algorithm will try and send more video content to the client device as fast as possible, taking into consideration the network conditions. While the network is not congested the agent will send out the traffic in a highest possible rate till reaching the full mark of the receive/jitter buffer. Once a receive buffer's full mark is reached, the agent will continue to take advantage of the network not being congested and will send the traffic in the required video bit-rate, which is the rate the buffer is being emptied by a video application on the respective client device. If the network becomes congested, as long as the jitter buffer doesn't indicate it has reached the predefined empty mark, the agent will send traffic towards the client device at a relatively low rate. Once the empty mark is reached the agent will send out the traffic towards the client device according to the required video bit-rate (this is the rate the buffer is being emptied in the client device) thus ensuring that the buffer isn't being emptied beyond this point. Once the network is freed from a congestion state, the agent can start sending the traffic at a higher bit-rate thus filling up the jitter buffer towards the full mark. Accordingly, the needs of the client device video application and those of the network may be balanced. Other variations of the algorithm are applicable to the present invention.

Figure 3:
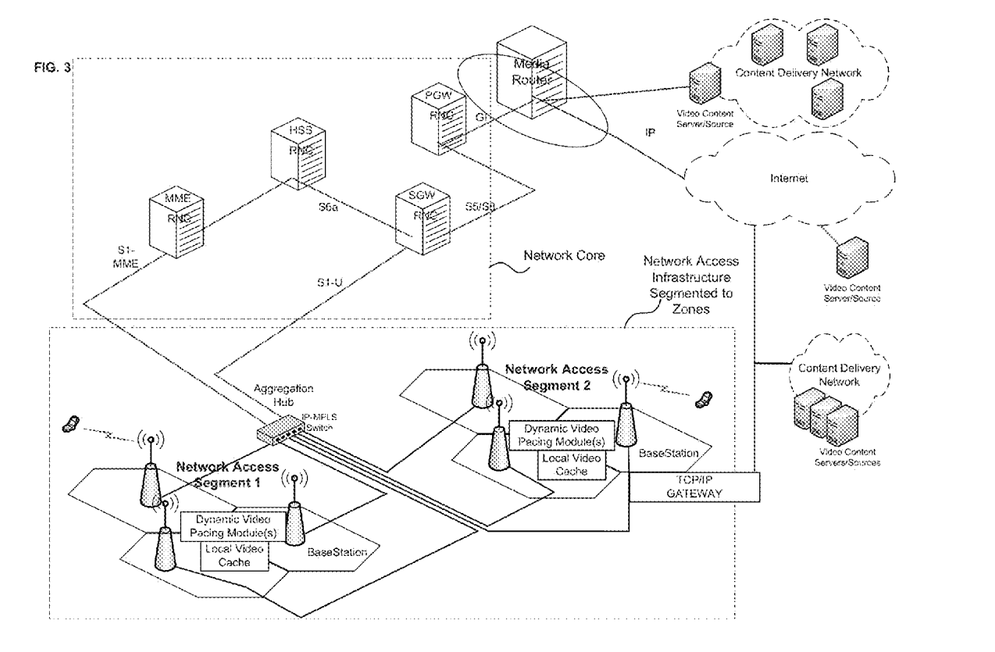
FIG. 3 is a network diagram of an exemplary cellular network according to embodiments, depicting placement of video pacing agents at each of multiple network access segments and functionally associated with optional local cache for caching some video streams requested by client devices connected to their respective access segments.

FIG. 3 is a network diagram of an exemplary cellular network according to embodiments and depicting placement of video pacing agents at each of multiple network access segments and functionally associated with optional local cache for caching some video streams requested by client devices connected to their respective access segments.

It should be understood that according to some embodiments, each of the separate caching entities mentioned may be implemented as separate caches, while according to other embodiments two or more of the caching entities may be combined into a single cache. Likewise, each of the modules, digital logics, data sniffing/detection elements, data blocking/injecting/responding elements, interface elements, network elements and/or decision making elements may be implemented separately and/or combined into the functionality of other Mobile Network associated hardware.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A device for pacing video data transmission from a wireless communication network access point to wireless client devices, said device comprising:
    interface circuitry configured to receive an encapsulated video stream being received at the access point from a video stream source;
    a video data extractor comprising video data extracting circuitry to de-encapsulate the video stream;
    a video data stream analyzer comprising video stream analyzing circuits configured to analyze packets within the video stream to determine a playback bit rate of the video stream;
    one or more buffers for buffering the video stream and transmitting the video stream to the wireless client device at a controllable pace;
    processing circuits configured to: (a) monitor an amount of video data transmitted to the wireless client from the one or more buffers, and (b) assess a current amount of data stored on a receive buffer on the wireless client device by: (i) calculating an amount of data already released from the receive buffer based on the determined required playback bit rate, and (ii) subtracting from the monitored amount of video data transmitted to the wireless client device the calculated amount of data already released from the receive buffer; and
    a controller configured to control the pace of transmission from the access point to the wireless client device, so as to maintain the receive buffer at a relative fullness state inversely related to a state of congestion within the wireless network, based on an estimation of a current status of the receive buffer, the estimation being performed by said processing circuits based on the current amount of data stored on the receive buffer assessed by the processing circuits.

2. A device according to claim 1, wherein said controller further factors a wireless network transmission condition when setting the video stream transmission rate.

3. A device according to claim 1, wherein said processing circuitry is configured to calculate an amount of data released from the receive buffer by integrating the determined required playback bit rate across a duration the video stream has been transmitted to the wireless client.

4. A method for pacing video data transmission from a wireless communication network access point to wireless client devices, said method comprising:
    receiving an encapsulated video stream being received at the access point from a video stream source;
    using video data extracting circuitry to de-encapsulate the video stream;
    using video stream analyzing circuits to analyze packets within the video stream to determine a playback bit rate of the video stream;
    buffering the video stream using one or more buffers and wirelessly transmitting the video stream from the one or more buffers to the wireless client device at a controllable pace;
    monitoring an amount of video data transmitted to the wireless client from the one or more buffers;
    continuously assessing, a current amount of data stored on a receive buffer on the wireless client device by: (i) calculating an amount of data already released from the receive buffer based on the determined required playback bit rate, and (ii) subtracting from the monitored amount of video data transmitted to the wireless client device the calculated amount of data already released from the receive buffer; and
    controlling the pace of transmission from the access point to the wireless client device, so as to maintain the receive buffer at a relative fullness state inversely related to a state of congestion within the wireless network, based on an estimation of a current status of the receive buffer, the estimation being performed by said processing circuits based on the current amount of data stored on the receive buffer assessed by the processing circuits.

5. A method according to claim 4, further comprising factoring a wireless network transmission condition when setting the video stream transmission rate.

6. A method according to claim 4, comprising calculating an amount of data released from the receive buffer by integrating the determined required playback bit rate across a duration the video stream has been transmitted to the wireless client.

7. A system for pacing video data transmission from a wireless communication network access point to wireless client devices, said system comprising:
    interface circuitry configured to receive an encapsulated video stream being received at the access point from a video source;
    wireless transmission circuitry;

a video data extractor comprising video data extracting circuitry to de-encapsulate the video stream;

a video data stream analyzer comprising video stream analyzing circuits configured to analyze packets within the video stream to determine a playback bit rate of the video stream;

one or more buffers for buffering the video stream and transmitting the video stream through the wireless transmission circuitry to the wireless client device at a controllable pace;

processing circuits configured to: (a) monitor an amount of video data transmitted to the wireless client from the one or more buffers, and (b) assess a current amount of data stored on a receive buffer on the wireless client device by: (i) calculating an amount of data already released from the receive buffer based on the determined required playback bit rate, and (ii) subtracting from the monitored amount of video data transmitted to the wireless client device the calculated amount of data already released from the receive buffer; and a controller configured to control the pace of transmission from the access point to the wireless client device, so as to maintain the receive buffer at a relative fullness state inversely related to a state of congestion within the wireless network, based on an estimation of a current status of the receive buffer, the estimation being performed by said processing circuits based on the current amount of data stored on the receive buffer assessed by the processing circuits.

8. A system according to claim 7, wherein said controller further factors a wireless network transmission condition when setting the video stream transmission rate.

9. A system according to claim 7, wherein said processing circuitry is configured to calculate an amount of data released from the receive buffer by integrating the determined required playback bit rate across a duration the video stream has been transmitted to the wireless client.

* * * * *